United States Patent
Inaba et al.

(10) Patent No.: US 6,897,856 B2
(45) Date of Patent: May 24, 2005

(54) DISPLAY CONTROL DEVICE

(75) Inventors: Hiroyuki Inaba, Tokyo (JP); Junichiro Hara, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 310 days.

(21) Appl. No.: 09/919,808

(22) Filed: Aug. 2, 2001

(65) Prior Publication Data

US 2002/0015035 A1 Feb. 7, 2002

(30) Foreign Application Priority Data

Aug. 2, 2000 (JP) .................................... P. 2000-234821

(51) Int. Cl.[7] ................................................ G09G 5/00
(52) U.S. Cl. .................................... 345/204; 340/438
(58) Field of Search ................................ 340/438, 439, 340/459, 461, 500, 517, 519, 520, 522, 532; 345/204; 701/1

(56) References Cited

U.S. PATENT DOCUMENTS

| | | | | |
|---|---|---|---|---|
| 3,964,018 A | * | 6/1976 | Strait et al. ................. | 340/461 |
| 4,287,503 A | * | 9/1981 | Sumida ....................... | 340/461 |
| 4,787,039 A | * | 11/1988 | Murata .......................... | 701/1 |
| 5,121,112 A | * | 6/1992 | Nakadozono .......... | 340/870.16 |
| 5,241,295 A | * | 8/1993 | Madau ....................... | 340/461 |
| 5,325,082 A | * | 6/1994 | Rodriguez .................. | 340/438 |
| 5,648,755 A | * | 7/1997 | Yagihashi .................... | 340/439 |
| 5,757,268 A | * | 5/1998 | Toffolo et al. .............. | 340/461 |
| 5,796,936 A | * | 8/1998 | Watabe et al. ............... | 358/1.9 |
| 5,847,704 A | * | 12/1998 | Hartman ..................... | 345/764 |
| 5,880,710 A | * | 3/1999 | Jaberi et al. ................ | 345/618 |
| 5,982,368 A | * | 11/1999 | Toffolo et al. ............. | 345/835 |
| 6,351,705 B1 | * | 2/2002 | Yoshioka .................... | 701/200 |
| 6,429,845 B1 | * | 8/2002 | Unseld et al. .............. | 345/618 |
| 6,434,450 B1 | * | 8/2002 | Griffin et al. .................. | 701/1 |

FOREIGN PATENT DOCUMENTS

JP 7-123019 5/1995 ............ H04B/1/16

\* cited by examiner

Primary Examiner—Chanh Nguyen
(74) Attorney, Agent, or Firm—Sughrue Mion, PLLC

(57) ABSTRACT

A display control device is provided with an input signal processing section for processing an input signal, a display section for displaying an image, a first display control section for processing an output signal from the input signal processing section to be displayed on the display section, a second display control section operated by an operation program for OS, and a signal switching section for outputting the display signal from the second display control section on to the display section at the normal time. The second display control section processes an output signal from the first display control section to be displayed on the display section. The signal switching section outputs the display signal from the first display control section onto the display section when an abnormal condition of the second display control section is detected.

12 Claims, 7 Drawing Sheets

FIG. 2

| ALARM ITEMS | | MEMORY CONTENTS OF FIRST ROM 2 | |
|---|---|---|---|
| (1) | BATTERY VOLTAGE ALARM | 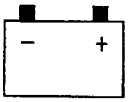 | STOP AT A SAFE PLACE SOON AND CONTACT WITH DEALER. |
| (2) | ENGINE OIL PRESSURE ALARM |  | STOP AT A SAFE PLACE SOON AND CONTACT WITH DEALER. |
| (3) | CTV ALARM | CVT | AVOID HIGH SPEED RUNNING AND BE INSPECTED IN DEALER SOON. |
| (4) | SEAT BELT ALARM |  | FASTEN SEAT BELT. |
| (5) | REAR HOOD ALARM |  | DOOR AND HATCH ARE OPEN. CLOSE THEM. |
| (6) | FUEL REMAINING AMOUNT ALARM | 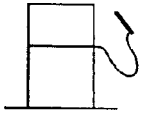 | NO FUEL EXISTS. GO TO GAS STAND. |
| (7) | WATER TEMPERATURE ALARM | 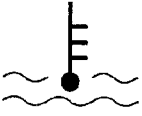 | STOP AT A SAFE PLACE SOON AND CONTACT WITH DEALER. |

STOP AT A SAFE PLACE SOON, AND
CONNECT WITH XX SALES COMPANY.

DISPLAY CONTROL DEVICE

BACKGROUND OF THE INVENTION

1. Field of the Invention

The present invention relates to a display control device, for example, to display the car speed by using a personal computer, commonly called PC.

2. Description of the Related Art

As this type device, it has been proposed a device in which the personal computer operated by a program for an OS (operating system) is mounted in a car, to control, for example, an audio device provided in the car (for example, JP-A-7-123019) For example, it has been used that the personal computer judges whether the traffic information data exists in the FM radio wave received by a radio, and in the case where it is judged that the traffic information data exists, when the car speed is 0 km, at an appropriate timing, the radio broadcasting is switched to the traffic information and the traffic information is displayed on the display unit, and in the case of car-running, the traffic information data is written into the memory, and when the running speed is not larger than a predetermined value, it is read out, and displayed.

However, this kind of personal computer generally has a defect that the program runaway is easily generated, but, when the computer is applied to the car mount electronic system by which the data of the traffic information is processed, even when the traffic information is temporarily not obtained due to this program runaway, there is no problem in the traffic safety.

On the one hand, in the case where this personal computer is applied to the car mount display system, there is a problem that when the display of the car speed, number of engine revolution, warning, water temperature, oil pressure, is temporarily not displayed due to the program runaway, there might generate the possibility that the safety standard of the car is not satisfied.

SUMMARY OF THE INVENTION

Accordingly, an object of the present invention is to use the personal computer in the car and to always display items necessary for safety driving, such as a car speed and the number of engine revolution even when the program runs away.

According to the invention, there is provided a display control device comprising:

an input signal processing section for processing an input signal;

a display section for displaying an image;

a first display control section for processing an output signal from the input signal processing section to be displayed on the display section;

a second display control section operated by an operation program for OS, the second display control section for processing an output signal from the first display control section to be displayed on the display section; and a signal switching section for outputting the display signal from the second display control section on to the display section at the normal time, the signal switching section for outputting the display signal from the first display control section onto the display section when an abnormal condition of the second display control section is detected.

According to the invention, the display control device according to claim 1 may comprises an abnormality detection section for detecting the abnormal condition of the second display control section;

wherein the signal switching section outputs the display signal from the first display control section onto the display section when the abnormality detection section detects the abnormal condition of the second display control section.

According to the invention, the first display control section may comprise the abnormality detection section.

According to the invention, wherein the second display control section may comprise the abnormality detection section.

According to the invention, the operation program in the second display control section may be rewritable.

According to the invention, the display signal from the first display control section may represent almost the same as the display signal from the second display control section.

According to the invention, the display signal outputted from the first display control section may be lower in display resolution than the display signal outputted from the second display control section.

According to the invention, the display signal outputted from the first display control section may be fewer in data amount than the display signal outputted from the second display control section.

According to the invention, the operation program may be read from a memory card, and stored in the second display control section.

According to the invention, the operation program may be read from a server through a network, and stored in the second display control section.

BRIEF DESCRIPTION OF THE DRAWINGS

FIG. 2 is an explanatory drawing of character image data for the warning stored in an EEPROM.

DETAILED DESCRIPTION OF THE PRESENT INVENTION

The present invention will be described with reference to the accompanying drawings.

First Embodiment

Figure 1:
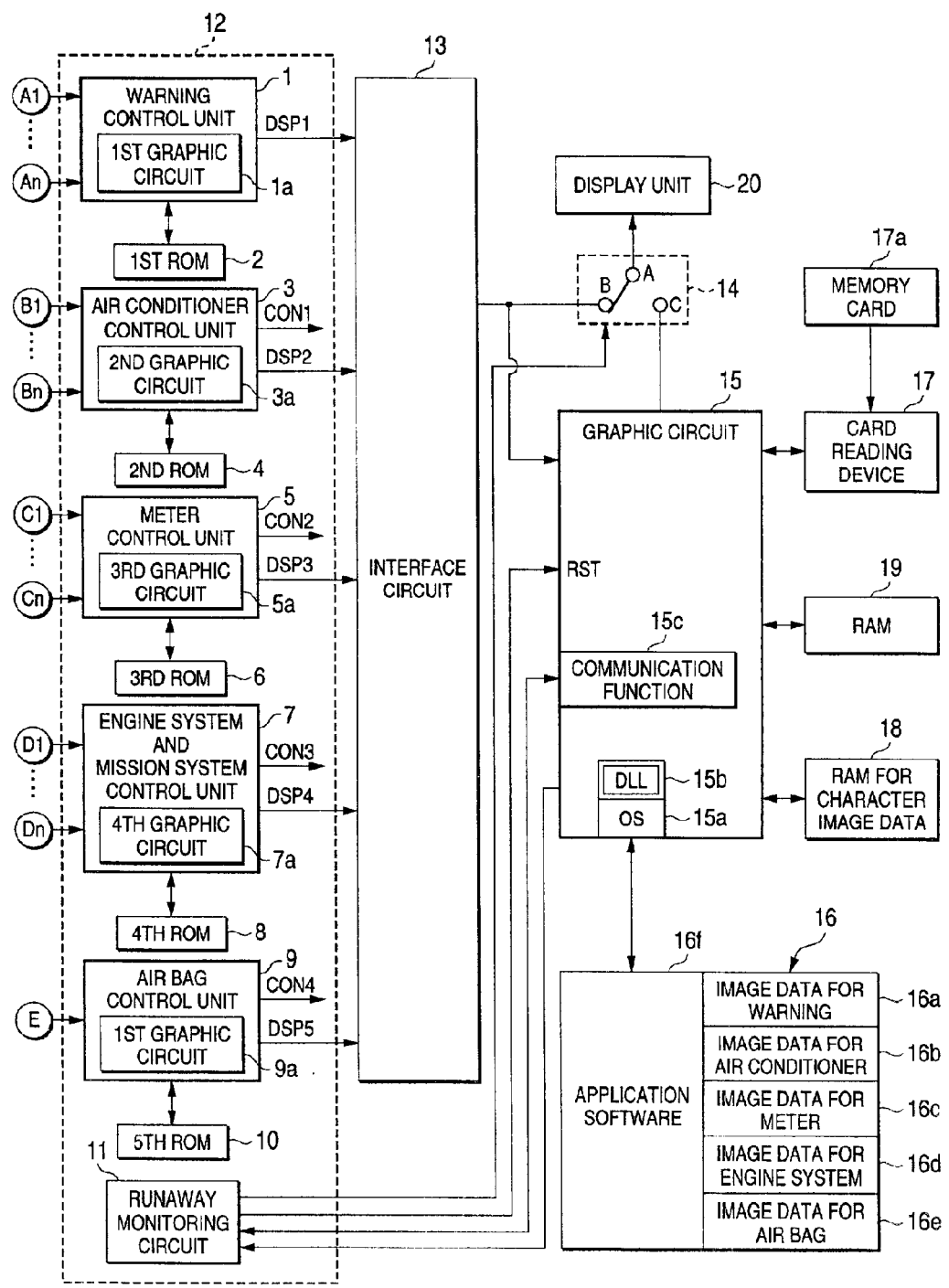
FIG. 1 is a circuit block diagram for explaining a first embodiment according to the present invention.

Referring to FIG. 1, a first embodiment will be described below.

Numeral 1 is a warning control unit, and to which each kind of signals A1–An from a water temperature sensor, not shown, seat belt set and detachment switch, or door lock switch, are inputted in parallel, and which judges from which sensor or switch the inputted signals A1–An are inputted. The warning control unit 1 compares and judges the signals to the normal values of the sensors or switches stored in the first ROM 2 constituting a memory, and judges whether these signals are in the normal conditioner abnormal condition. When these signals are judged to be in the abnormal condition, the character and image data for the alarm corresponding to the kind of the alarms stored in the first ROM 2 is read out by the first graphic circuit 1a housed in the unit, and on the basis of the read out character and image data for the alarm, the character and image data for the alarm DSP1 is made, and supplied to an interface circuit 13 which will be described later. In this connection, the first ROM 2 stores, as shown in FIG. 2, the symbol, and legend for each of a battery voltage alarm, engine oil pressure alarm, CVT alarm, seat belt alarm, rear hood alarm, fuel remaining amount alarm, and water temperature alarm, and the first graphic circuit 1a reads out these data at need.

Numeral 3 is an air conditioner control unit, and to which each kind of signals B1–Bn from an outside air temperature sensor, not shown, water temperature sensor, car room internal temperature sensor, setting temperature sensor, air conditioner switch, and wind amount setting sensor, are inputted, According to these signal B1–Bn, a signal CON 1 is made, to control the operation condition of a compressor, not shown, and the outside air introduction door so that the car room internal temperature becomes the setting temperature, and supplied to an actuator of the compressor and the outside air introduction door, and the character•image data DSP 2 (in the same manner as the first ROM 2, the same level one is stored) which is necessary for displaying the setting temperature of the car room, outside air introduction, inside air circulation, and blowing air amount, is read out from the second ROM 4 constituting the memory by the second graphic circuit 3a housed in the unit, and the character•image data DSP2 is supplied to the interface circuit 13, which will be described later.

Numeral 5 is a meter control unit, and to which each kind of signals C1–Cn from a car speed sensor, not shown, engine revolution sensor, fuel remaining amount sensor, and water temperature sensor are inputted, and a meter indication signal CON 2 corresponding to an output of respective sensors, is made, and is supplied to a pointer type movement drive control circuit (not shown) arranged in an instrument panel in the car room, and the character•image data DSP 3 for the meter display corresponding to the meter indication signal CON 2 is read out from the third ROM 6 constituting the memory by the third graphic circuit 5a housed in the unit, and the character•image data DSP 3 for the meter display is supplied to the interface circuit 13, which will be described later. In this connection, this the character•image data DSP 3 for the meter display (in the same manner as in the first ROM 2, the same level data is stored) is structured by the image data such as a dial, and pointer.

Numeral 7 is an engine system and mission system control unit, and to which each kind of signals D1–Dn from an engine oil level sensor, not shown, engine revolution sensor, and oil pressure sensor, are inputted, and according to these signal D1–Dn, an engine—mission control signal CON 3 is made, and a fuel consumption, and fuel injection quantity are calculated, and a display indication signal showing the calculated fuel consumption, and fuel injection quantity is made, and a this character•image data DSP 4 for the display (in the same manner as in the first ROM 2, the same level data is stored) corresponding to the fuel consumption, and fuel injection quantity, is read from the fourth ROM 8 constituting the memory by the fourth graphic circuit 7a housed in the unit, and the character•image data DSP 4 for the display is supplied to the interface circuit 13 which will be described later. Further, the engine system and mission system control unit 7 supplies the made engine—mission control signal CON 3 to the actuator, not shown.

Numeral 9 is an air bag control unit, and to which an acceleration signal E is inputted from an acceleration sensor, not shown, and according to the acceleration signal E, an air bag open signal CON 4 is made, and supplied to an inflator, not shown. Further, the air bag control unit 9 conducts each kind of failure diagnostic of the unit inside, and when the failure occurs, the character•image data for failure alarm DSP 5(in the same manner as in the first ROM 2, the same level data is stored) corresponding to the content of the failure is read from the fifth ROM 10 constituting the memory by the fifth graphic circuit 9a, and the character•image data for the failure alarm DSP 5 is supplied to the interface circuit 13, which will be described later.

Numeral 11 is a runaway monitoring circuit composed of a watch dog timer, and judges whether the program is normally operated in the graphic circuit 15, which will be described later, by the two methods of whether a clock pulse of a constant period is supplied from the graphic circuit 15, or a requiring signal for requiring an [answer back] is supplied to the communication function 15c of the graphic circuit 15, and whether the answer back signal to it is returned in a predetermined time, and when a situation in which either one of them is not satisfied, is generated, it is judged that the graphic circuit 15 is in abnormal condition due to the runaway, or breaking of a part of the circuit (circuit pattern), and a reset signal is supplied to a reset terminal RST of the graphic circuit 15.

In the first embodiment of the present invention, the car mount electronic unit 12 comprises the runaway monitoring circuit 11. However, the position of the runaway monitoring circuit 11 is not limited thereto, but the runaway monitoring circuit 11 may be incorporated in the graphic circuit 15.

Further, the runaway monitoring circuit 11 supplies the switching signal to the switching circuit 14 which will be described later, after a predetermined time later from the output of the reset signal, that is, after waiting until the graphic circuit 15 is perfectly in reset condition.

In this connection, the warning control unit 1, air conditioner control unit 3, meter control unit 5, engine system and mission system control unit 7, air bag control unit 9 and run a way monitoring circuit 11 structure the car mount electronic unit 12.

Numeral 13 is the interface circuit, and the supply of signals DSP 1–DSP 5 showing each kind of images, and characters from respective warning control unit 1 air conditioner control unit 3, meter control unit 5, engine system and mission system control unit 7, air bag control unit 9 is received to the input terminal, and the input terminal to which these signals are supplied, is always scanned, and when it is judged that the signal is newly supplied to the terminal other than the terminal to which the signal is now supplied, the newly supplied character • image signal DSP 1–DSP 4 or DSP 5 is inputted, and it is parallely supplied to the switching circuit 14 and graphic circuit 15, which will be described later, and the switching circuit 14 relays it as the display signal and outputs it.

Numeral 15 is the graphic circuit which is operated by the program, and in which a predetermined OS software 15a is assembled, and the character• image formation software DLL 15b which is operated according to the OS software 15a is assembled, and when the graphic circuit 15 starts the operation, The OS software 15a reads out the application software for image formation 16f from an EEPROM 16 constituting a non-volatile memory. On the one hand, when the character-image signals DSP 1–DSP 5 are supplied from the interface circuit 13, these data are temporarily stored in a RAM 18 for character•image data, and the OS software 15a judges whether these temporarily stored character•image signals DSP 1–DSP 5 correspond to the signal from anyone of warning control unit 1, air conditioner control unit 3, meter control unit 5, engine system and mission system control unit 7, or air bag control unit 9.

As the result, the graphic circuit 15 selects the character • image formation data 16a–16d or 16e at need form any one of the image data for warning 16a—image data for air bag 16e which are stored in the EEPROM 16, and temporarily stores it in the data RAM 19, and based on the selected character•image formation data 16a–16d or 16e, the image signal with the high resolving power is formed by the started image formation application software 16f, and is supplied to the switching circuit 14. For example, the character image (character, image shown in FIG. 3) with the high resolving power shown in FIG. 4, is supplied to the switching circuit 14.

In this connection, the resolving power (resolution) of the image signal supplied from the interface circuit 13 to the switching circuit 14 is obtained in the graphic circuit 15, and its coarseness is ⅛ to the resolving power of the supplied display signal or the coarseness is about ⅙ to the number of colors.

Further, in the graphic circuit 15, when the application software stored in a memory card 17a is supplied from a card reading device 17, which will be described later, the supplied application software renews the application software stored in the EEPROM 16, and is switched to the new application software.

Further, the graphic circuit 15 supplies clock pulses of a predetermined period (corresponding to generally called watch dog pulse) to the runaway monitoring circuit 11 at the time of normal operation. Further, in the meaning of confirming whether the graphic circuit 15 is normally operated, when the requiring signal to require the answer back is supplied from the runaway monitoring circuit 11 to a built-in communication function 15c, the answer back signal is returned, however, when the program is run away in the graphic circuit 15 or the wiring of the pattern is broken, and the circuit 15 is abnormal, the supply of the clock pulse is stopped.

Numeral 14 is a switch circuit, and when the power source is turned on, the contact points A and C are connected to each other, and the image signal supplied from the graphic circuit 15 is supplied to the display unit 20, and further, when the switching signal is supplied from the runaway monitoring circuit 11, the connection status of the contact points is switched to the connection of contact points A and B, and while the connection status is switched, the image signal from the interface circuit 13 is supplied to the display unit 20 and displayed.

Figure 3:
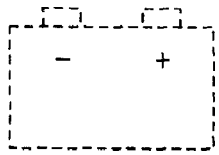
FIG. 3 is an explanatory drawing when the battery voltage alarm the stored in the first ROM in FIG. 1 is displayed on a display device.
Figure 4:
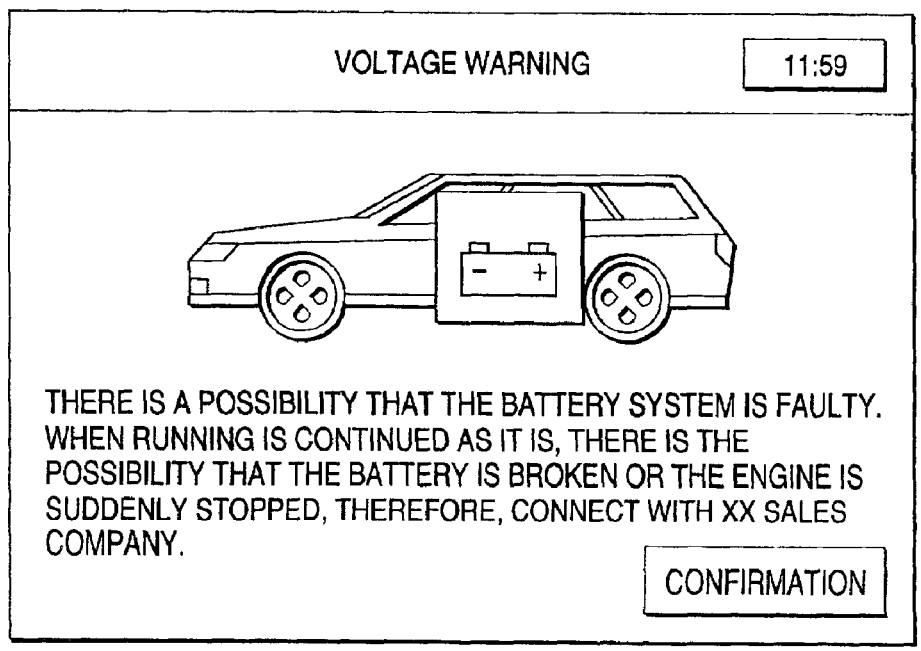
FIG. 4 is an explanatory drawing when the battery voltage alarm in an image data for warning in the EEPROM in FIG. 1, is displayed on the display device.

In this connection, as the specific example of the degree of the high resolution of the image data, that is, quality of the image data, stored in the EEPROM 16, it is a degree of the level shown in FIG. 4, to the level in which each of ROMs 2, 4, 6, 8, 10 of the car mount electronic unit 12 is show in FIG. 3. As shown in FIG. 3, each dot which means a segment of the display, can be seen, which means the resolution is low. However, as shown in FIG. 4, any dot cannot be seen, which means the resolution is sufficiently high. That is, the image shown in FIG. 3 has a lower resolution than that of FIG. 4, and each segment in FIG. 3 is bigger than that in FIG. 4. Accordingly, the data amount of FIG. 3 is lower than that of FIG. 4.

Figure 5:
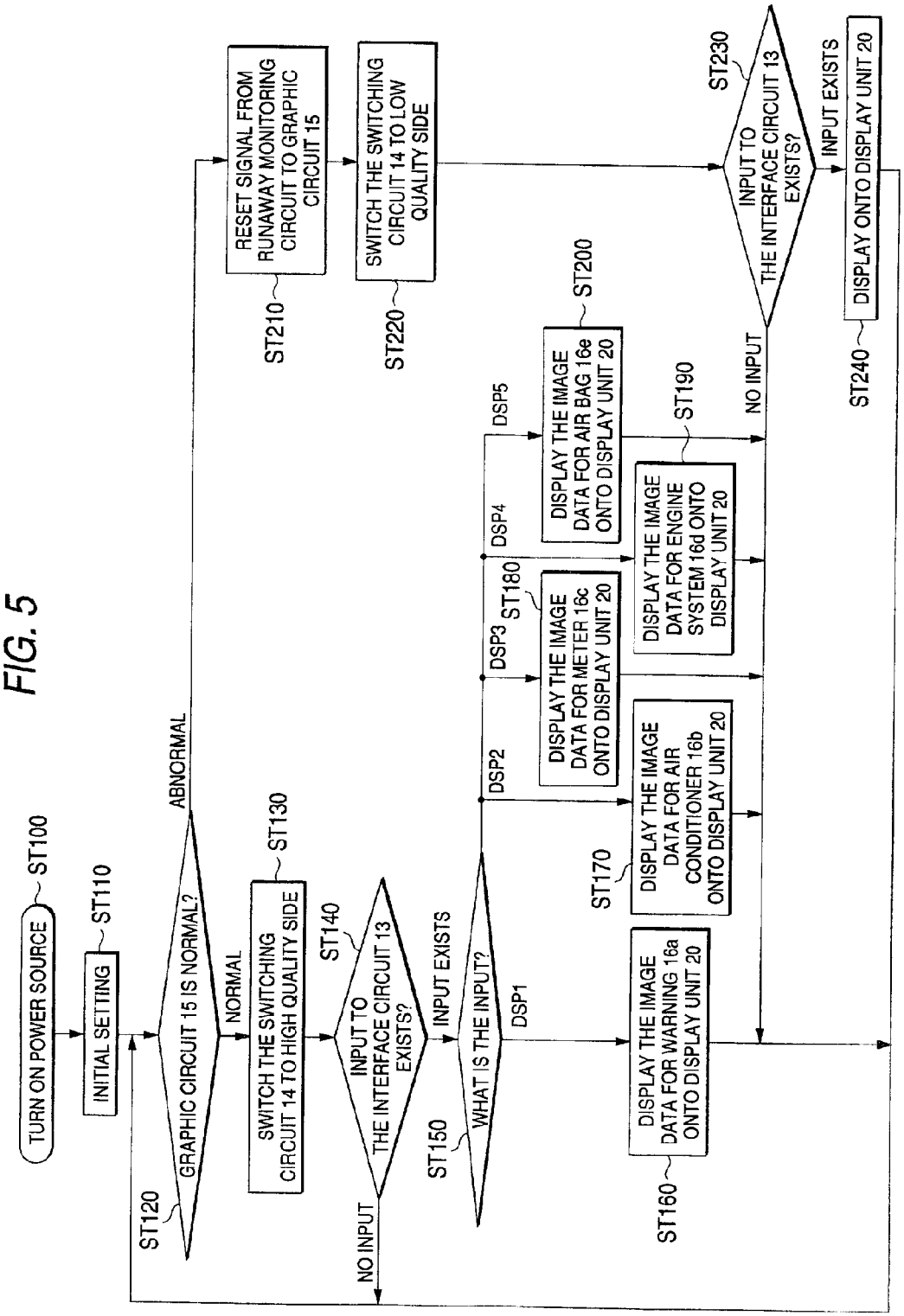
FIG. 5 is a flow chart for explaining the operation of the first embodiment.

Next, referring to FIG. 5, the operation of the above structure will be described.

1. At the normal time

When the power source is turned ON, the whole circuit shown in FIG. 1 is initially set (ST 100, 110), and the supply of clock pulse 15 from the graphic circuit 15 is received by the runaway monitoring circuit 11, and when it is judged to be normal (ST 120), the switching circuit 14 supplies the output of the graphic circuit 15 to the display unit 20 by the initial setting (ST 130). Then, the interface circuit 13 starts the reading of the input terminals by scanning by the multiplexer function in the regular order, and judges the existence of the input of the character•imaqe data in ST 140, and at the time of no existence, the sequence returns to ST 120, and at the time of existence, it advances to ST 150. In ST 150, the inputted image data is discriminated and the sequence advances to any one of ST 160-ST200. For example, initially, when the character • image data DSP 1 for warning display from the warning control unit 1 is read out in ST 150, the data is parallely outputted to both of the graphic circuit 15 and switching circuit 14 in ST 180. In this case, because the contact points A and C of the switching circuit 14 are connected to each other, this data is read out by the graphic circuit 15, and the graphic circuit 15 is, by the operation of the OS software 15, the image data corresponding to the kind of data, in this case, the image data for warning 16a is read from the EEPROX 16, and on the basis of previously read out character•image data DSP 1 for warning display and the image data 16a for warning red out this time, by the operation of the application software 16f operated based on the character•image formation program DLL 15b, the increase of the resolving power and the number of colors, and the image arrangement corresponding to it, are conducted, and it is supplied to the display unit 20 through the switching circuit 14, and the display is conducted with the high quality (ST 180). For example, the data shown in FIG. 3 is converted to the data shown in FIG. 4, and the sequence returns to ST 120.

2. When the graphic circuit 15 is abnormal

In the case where the software operated in the graphic circuit is run away, or the circuit apart of the circuit (circuit pattern) is broken in the hardware, when the runaway monitoring circuit 11 can not supply the clock pulse with a predetermined period, or the answer back signal can not be returned to the requiring signal supplied from the runaway monitoring circuit 11 to the communication function 15c for each predetermined period (ST 120), the runaway monitoring circuit 11 supplies the reset signal to the reset terminal RST of the graphic circuit 15 (ST 200), and after a predetermined time period, the runaway monitoring circuit 11 supplies the switching signal to the switching circuit 14, and the connection status of the contact points A and C is switched to the connection of the contact points A and B (ST 210), and when the character•image data for display is supplied from the car mount electronic unit 12 to the interface circuit 13 (ST 220), for example, the character image data DSP1 for warning display shown in FIG. 3, which is outputted from the interface circuit 13, is displayed on the display unit 20 (ST 230), and the sequence returns to ST 120.

Then, when the graphic circuit 15 returns to the normal operation (ST 120), because the clock pulse with predetermined period is supplied to the runaway monitoring circuit 11, and thereby, the supply of the switching signal to the switching circuit 14 is stopped, the switching circuit 14 switches the connection to the connection status of the contact points A and C, and supplies the character• image data (FIG. 4) from the graphic circuit 15 to the display unit 20.

3. When the application software 16f for the image formation is changed

Figure 6:
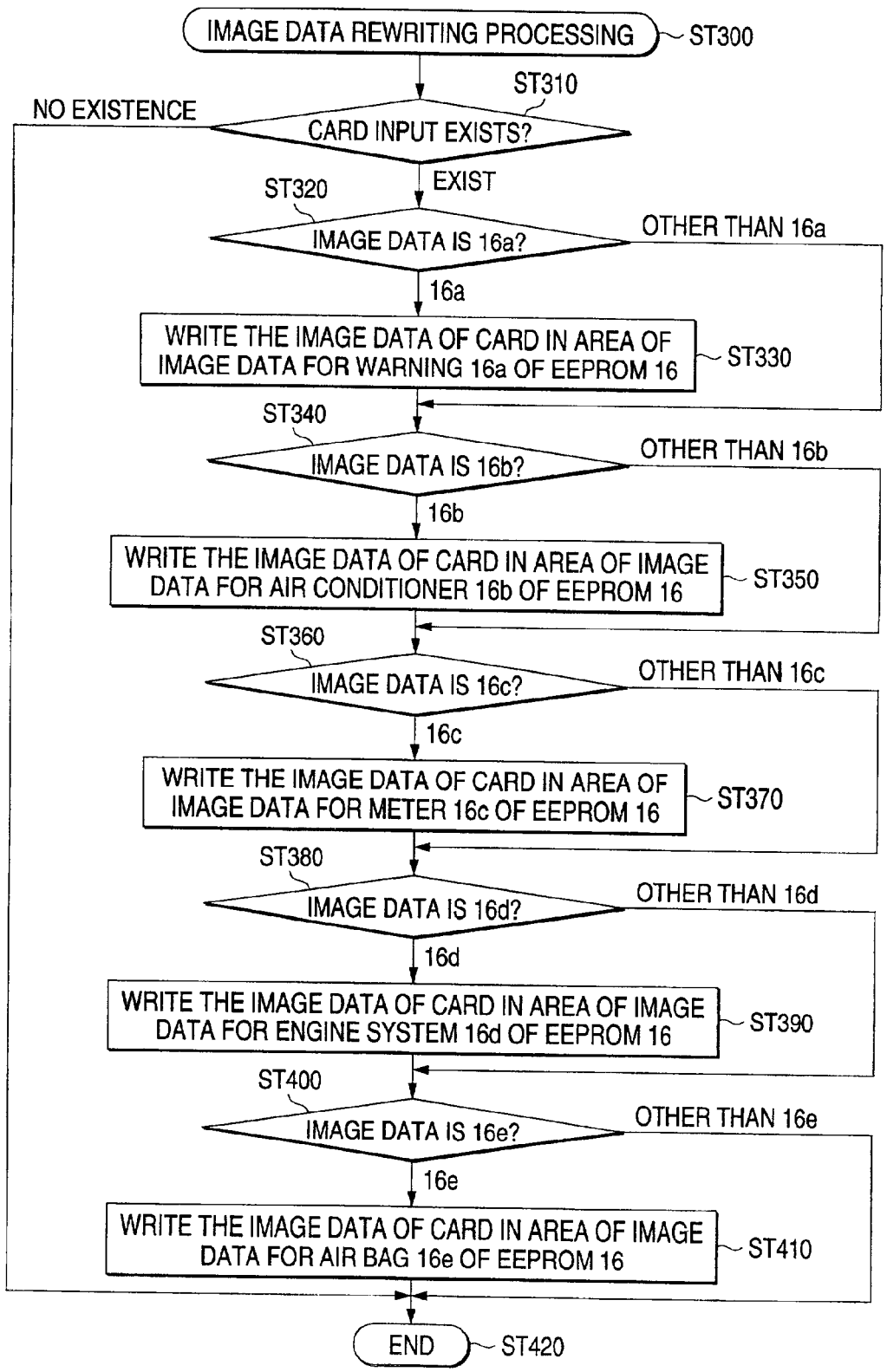
FIG. 6 is a flow chart in which an image formation application software in the first embodiment is changed.

When a memory card 17a in which the application software is written, is inserted into the card reading device 17, the sequence advances to a flowchart ST 300 in FIG. 6, a new application software is read in from the card reading device 17 to the graphic circuit 15, and when the graphic circuit 15 recognizes it (ST 310), when it is the image data for warning, in ST 330, and when it is the image data for air conditioner, in ST 340 and ST 350, when it is the image data for meter, in ST 360 and ST 370, when it is the image data for engine system, in ST 380 and ST 390, and when it is the image data for air bag, in ST 400 and ST 410, the data is written in an area of the EEPROM 16 in which the application software 16f for the image formation is written, by the operation of the OS software, and simultaneously, the application software which is used till now, is discarded, and the sequence ends in ST 420.

4. For example, when the image data for warning 16a is changed

When the memory card 17a in which the new image data for warning is written, is inserted into the card reading device 17, the new image data for warning is read in from the card reading device 17 to the graphic circuit 15 in ST 320 and ST 330, and by the operation of the OS software, the image data for warning is written in the predetermined area 16a of the EEPROM 16, and simultaneously, the image data for warning used till now, is discarded.

Variation of First Embodiment

Figure 8:
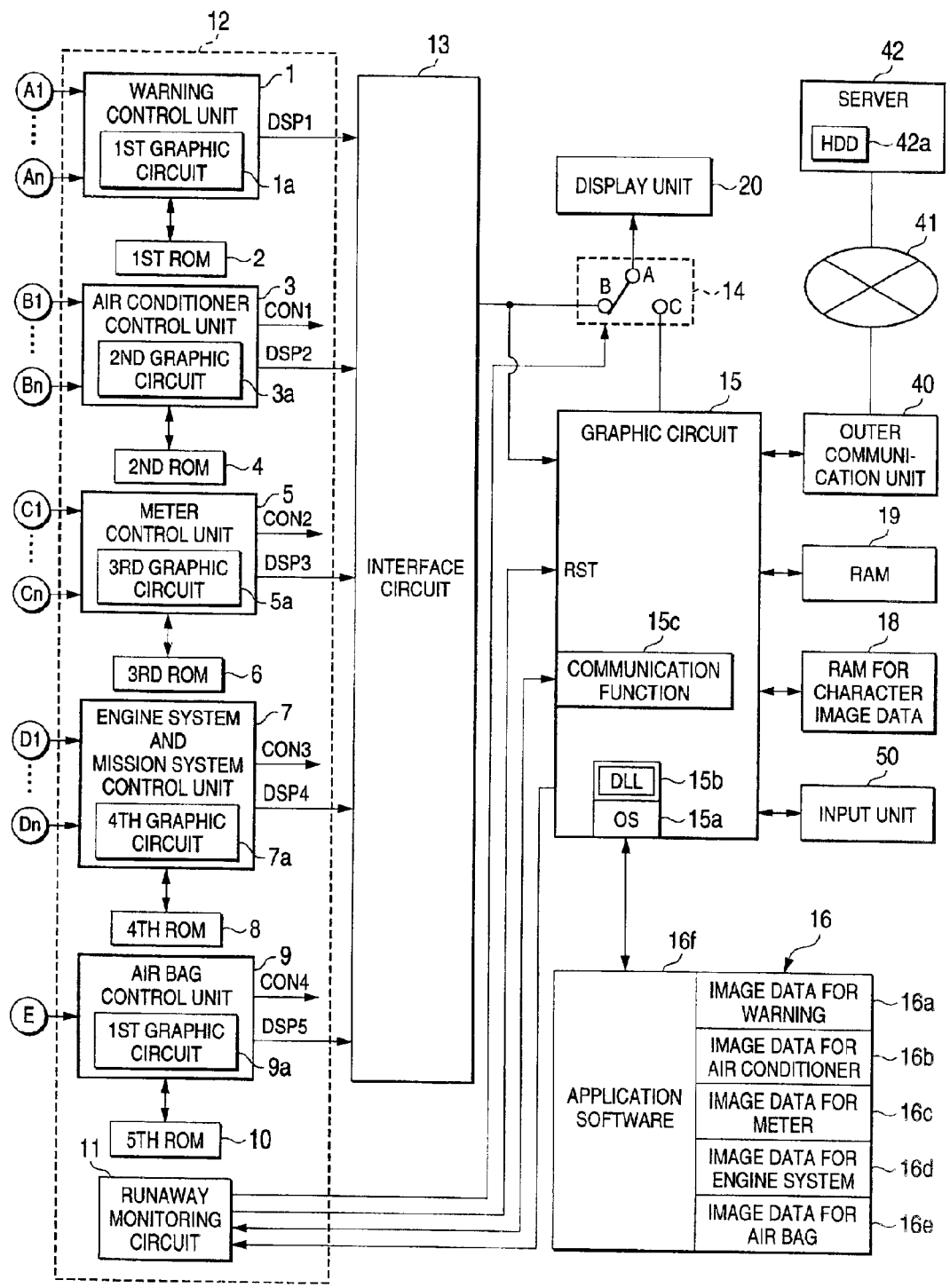
FIG. 8 is a circuit blockdiagram for explaining a variation of the first embodiment according to the present invention.

FIG. 8 is a circuit diagram showing a variation of the first embodiment according to the present invention, and is the same as FIG. 1 except that the card reading device 17 and memory card 17a in FIG. 1 is replaced with an outer communication unit 40, Internet 41, and a server 42 containing a hard disc drive unit (HDD) in FIG. 8.

The graphic circuit 15 is detachably connected to Internet 41 via the outer communication unit 40 such as a modem or network card. The server 42 is also connected to the Internet, so that the graphic circuit 15 can communicate with the server 42 when the graphic circuit 15 is connected to Internet 41.

The server 42 stores a plurality of application software in the HDD 42, each of which is downloaded therefrom in accordance with a request from the graphic circuit 15 in response to an input from an input unit 50 such as a keyboard or mouse. The server 42 also stores image date 16a to 16e for warning, air conditioner, meter, engine system, and air bag, which are also downloaded from the server 42 as well as the application software.

The outer communication unit 40 downloads the application software or image data from the server 42 via Internet 41 and supplies to the graphic circuit 15. The application software or image data stored in the EEPROM 16 is replaced by the application software or image data downloaded from the server 42 to update the application software or image data in the EEPROM 16.

Each application software or image data stored in the HDD 42a of the server 42 maybe updated or new application software or image data is added to the server 42 for use in the graphical circuit 15.

In this variation, the outer communication unit 40 may be connected to the server 42 via a LAN, wireless LAN, or any kind of communication network in place of Internet 41.

In this variation, it is preferable that the graphic circuit 15 retrieves the contents of the ADD 42a in the server 42 at predetermined intervals to find the updated application software or image data, or added new application software or image data. In this case, if the new software or image data is found, the graphic circuit automatically downloads the application software updated or added to update or add the application software in the EEPROM 16.

The graphic circuit 15 may send any of the signals DSP 1 to 5 outputted from the warning control unit 1, air conditioner control unit 3, meter control unit 5, engine system and mission system control unit 7, and airbag control unit 9, in accordance with the instruction input from the input unit 50. If the server 42 receives one of the signals DSP 1 to 5, the server 15 can carry failure diagnosis based on the signal received, and returns the results of the failure diagnosis to the graphic circuit 15, which can be displayed on the display unit 20.

Second Embodiment

Figure 7:
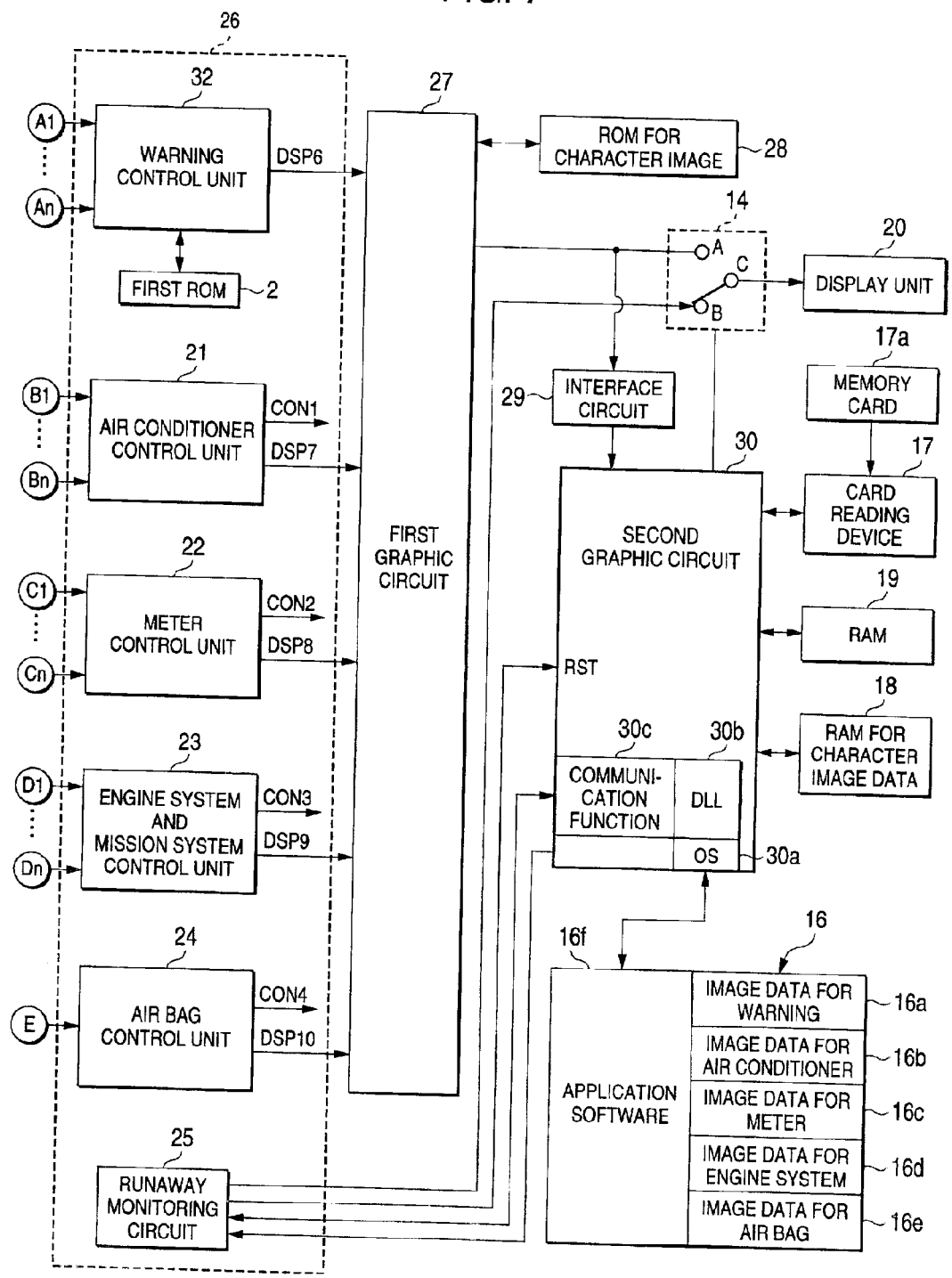
FIG. 7 is a circuit block diagram for explaining a second embodiment according to the present invention.

Referring to FIG. 7, the second embodiment will be described, however, the same structure as the structure previously described in FIG. 1, or the structure equal to that, is denoted by the same code, and its detailed description will be neglected and only the different structure will be described.

Numeral 32 is the warning control unit, and each kind of signals A1–An from the water temperature sensor, not shown, seat belt set and detachment switch, and door lock switch are parallely inputted from the outside, and when any one of signals A1–An is inputted, the kind of the inputted signal is judged, and the inputted signals are compared to the normal values of the sensor and switch stored in the first ROM 2, and judges whether they are on the normal condition, or the abnormal condition, and when it is judged that they are abnormal, the code signal DSP 6 showing the kind of the abnormality to alarm is supplied to the first graphic circuit 27.

Numeral 21 is the air conditioner control unit, and to which each kind of signals B1–Bn from an outside air temperature sensor, not shown, water temperature sensor, car room internal temperature sensor, and setting temperature sensor, are inputted, and according to these signal B1–Bn, a control signal CON 1 is made, to control the actuator of a compressor, not shown, and the outside air introduction door so that the car room internal temperature becomes the setting temperature, and supplied to the actuator of the compressor, and the outside air introduction door, and the code signal DSP7 which is necessary for displaying the setting temperature-inside the car room, outside air introduction, inside air circulation, and blowing air amount, is supplied to the first graphic circuit 27.

Numeral 5 is a meter control unit, and to which each kind of signals C1–Cn from a car speed sensor, not shown, engine revolution sensor, fuel remaining amount sensor, and water temperature sensor are inputted from the outside, and a meter indication signal CON 2 corresponding to an output of respective sensors, is made, and is supplied to a pointer type movement drive control circuit (not shown), and the code signal DSP8 corresponding to the meter indication signal CON 2 is supplied to the first graphic circuit 27.

Numeral 23 is an engine system and mission system control unit, and to which each kind of signals D1–Dn from an engine oil level sensor, not shown, engine revolution sensor, and oil pressure sensor, are inputted from the outside, and according to these signal D1–Dn, an engine •mission control signal CON 3 is made, and a fuel consumption, and fuel injection quantity are calculated, and a display indication signal showing the calculated fuel consumption, and fuel injection quantity is made, and a code signal DSP 9 corresponding to the fuel consumption, and fuel injection quantity, is supplied to the first graphic circuit 27. Further, the engine system and mission system control unit 23 supplies the made engine mission control signal CON 3 to the actuator, not shown.

Numeral 24 is an air bag control unit, and to which the acceleration signal E is inputted from the acceleration sensor, not shown, and according to the acceleration signal E, an air bag open signal CON 4 is made, and supplied to an inflator, not shown, and drives it, and the air bag control unit 24 conducts the failure diagnostic of the unit inside, and when the failure occurs, the code signal DSP 10 corresponding to the content of the failure is supplied to the first graphic circuit 27.

Numeral 25 is a runaway monitoring circuit, and the judge whether the program is normally operated in the second graphic circuit 30, which will be described later, is conducted by the two methods of whether a clock pulse with a constant period is supplied from the second graphic circuit 30, or whether the answer back signal to the supply of a requiring signal for requiring an [answer back] to the communication function 15c of the second graphic circuit 30, is returned in a predetermined time, and when either one of them is not satisfied, it is judged that the second graphic circuit 30 is in abnormal condition due to the runaway, or breaking of a part of the circuit (circuit pattern), and a reset signal is supplied to a reset terminal RST of the second graphic circuit 30.

Further, the runaway monitoring circuit 25 supplies the switching signal to the switching circuit 14, after a predetermined time later from the output of the reset signal, and after waiting until the second graphic circuit 30 is perfectly in reset condition.

In this connection, the warning control unit 32, air conditioner control unit 21, meter control unit 22, engine system and mission system control unit 23, air bag control unit 24 and runaway monitoring circuit 25 structure the car mount electronic unit 26.

Numeral 27 is the first graphic circuit, and the supply of code signals DSP 6–DSP 10 from respective warning control unit 32, air conditioner control unit 21, meter control unit 22, engine system and mission system control unit 23, and air bag control unit 24 is received, and the input terminal to which these signals are supplied, is always scanned, and when the code signal is newly supplied to the terminal other than the terminal to which the signal is now supplied, the newly supplied code signal DSP 6–DSP 9 or DSP 10 is inputted, and the character • image formation data corresponding to the code signal is read from the character•image ROM 28, and the character•image data is supplied in parallel to the switching circuit 14 and interface circuit 29.

In this connection, the character•image ROM 28 corresponds to the ROM in which the first ROM 2, the second ROM 4, the third ROM 6, the fourth ROM 8, and the fifth ROM 10 are collected to one ROM, and the same data as the character • image data which is dispersively stored as described above is stored.

Numeral 30 is the second graphic circuit in which a predetermined OS software 30a is assembled, and the character • image formation software DLL 30b which is operated according to the OS software 30a is assembled, and when the second graphic circuit 15 starts the operation, the OS software 15a reads out the application software 16f for image formation from an EEPROM 16 constituting a non-volatile memory, and the character•image signals DSP 6–DSP 10 supplied from the first graphic circuit 27 through the interface circuit 29, are temporarily stored in a RAM 18 for image data, and the OS software 30a judges whether these temporarily stored character•image signals DSP 6–DSP 10 correspond to the signal from any one of warning control unit 32, air conditioner control unit 21, meter control unit 22, engine system and mission system control unit 23, or air bag control unit 24.

As the result, the second graphic circuit 30 selects the character•image formation data 16a–16e corresponding to it, form the image data for warning 16a—image data for air bag 16e which are stored in the EEPROM 16, and temporarily stores it in the data RAM 19, and on the basis of the selected character image formation data 16a–16d or 16e, the image signal is formed by the started image formation application software 16f, and is supplied to the switching circuit 14.

Further, in the second graphic circuit 30, when the application software stored in a memory card 17a is supplied from the card reading device 17, which will be described later, the supplied application software renews the application software stored in the EEPROM 16, and the new software is stored.

Further, the second graphic circuit 30 supplies clock pulses with a predetermined period to the runaway monitoring circuit 25 at the time of normal operation, and further, when the requiring signal is supplied from the runaway monitoring circuit 25 to the communication function 30c, the answer back signal is supplied, however, at the abnormal time of runaway, the supply of the clock pulse is stopped, or the supply of the answer back signal is stopped, Next, the operation of the above structure will be described.

1. At the normal time

When the power source is turned ON, the switching circuit 14 supplies the output of the second graphic circuit 30 to the display unit 20 by the initial setting. Then, the first graphic circuit 27 reads the input terminals by scanning in the regular order, and initially, when, for example, the code signal DSP8 from the meter control circuit 22 is read out, the first graphic circuit 27 reads out the character image data corresponding to the code signal DSPS, and supplies it to the interface circuit 29.

The second graphic circuit 30 reads the character•image data from the interface circuit 29, and by the operation of the OS software 30a, the image data corresponding to the kind of the read out character•image data, in this case, the image data 16c for mater is read from the EEPROM 16, and on the basis of the read out character•image data DSP 8 for the meter display and the image data for meter 16c, the increase of the resolving power and the increase of the number of colors are conducted by the operation of the application software 16f which is operated under the image formation program DLL, and it is supplied to the display unit 20 through the switching circuit 14, and the high quality display is conducted.

2. When the second graphic circuit 30 is abnormal

In the case where, for example, a signal corresponding to the voltage alarm is outputted from the warning control unit 32, when the software operated in the second graphic circuit 30 is run away, or a part of the circuit (circuit pattern) is broken, or the clock pulse with a predetermined period can not be supplied to the runaway monitoring circuit 25, or the answer back signal can not be returned to the requiring signal supplied from the runaway monitoring circuit 25 to the communication function 30c for each predetermined period, the runaway monitoring circuit 25 supplies the reset signal to the reset terminal RST of the second graphic circuit 30, and after a predetermined time period, the runaway monitoring circuit 25 supplies the switching signal to the switching circuit 14, and it is outputted from the interface circuit 29. For example, the character•image data DSP 6 for warning shown in FIG. 3, is displayed on the display unit 20.

Then, when the software operated in the second graphic circuit 30 returns to the normal operation, because the clock pulse with predetermined period is supplied to the runaway monitoring circuit 25, and further, the answer back signal can be returned to the requiring signal supplied from the runaway monitoring circuit 25 to the communication function 30c in a predetermined time period, the runaway monitoring circuit 25 releases the supply of the reset signal, and after a predetermined time, the supply of the switching signal to the switching circuit 14 is released, and the character•image data DSP 6 for warning display outputted from the runaway monitoring circuit 25 is converted into the high quality data as shown in FIG. 4, and is displayed on the display unit 20.

3. When the image formation application software 16f is changed

When a memory card 17a in which the application software is written, is inserted into the card reading device 17, a new application software is read in from the card reading device 17 to the second graphic circuit 30, and by the operation of the OS software, the image formation application software 16f is written in a predetermined area of the EEPROM 16, and simultaneously, the application software which is used till now, is renewed.

4. For example, when the image data 16a for warning is changed

When the memory card 17a in which the new image data for warning is written, is inserted into the card reading device 17, the new image data for warning is read in from the card reading device 17 to the second graphic circuit 30, and by the operation of the OS software, the image data 16a for warning is written in the predetermined area of the EEPROM 16, and simultaneously, the image data 16a for warning used till now, is renewed.

According to the display device of the present invention, the advantages of the computer operated by using the OS, for example, advantages of (1) each kind of software is complete, (2) the software is cheap, (3) the image display is fine, are utilized, and because the display of the tachometer and engine revolution meter can be made high quality, the effect that the product value is enhanced, can be obtained. Further, because the software can be obtained at low cost and easily, the effect that the development of the product can be conducted in a short period of time, can be obtained.

Further, the effect that the development cost can be decreased, and further, the development can be conducted in a short period of time, can be obtained.

Further, when the display contents formed by the both can be the same or similar, even when these are switched, the effect that the display can be conducted without any strange feeling, can be obtained.

Moreover, in case that the display has not recovered regardless that a sufficient predetermined period of time has elapsed, the user can easily be aware that any of the hardware in the system is out of order.

What is claimed is:

1. A display control device comprising:
an input signal processing section for processing an input signal;
a display section for displaying an image;
a first display control section for processing an output signal from the input signal processing section and outputting a first display signal to be displayed on the display section;
a second display control section operated by an operating system program, the second display control section for processing the first display signal from the first display control section and outputting a second display signal to be displayed on the display section; and
a signal switching section for outputting the second display signal from the second display control section on to the display section at the normal time, the signal switching section for outputting the first display signal from the first display control section onto the display section when an abnormal condition of the second display control section is detected.

2. The display control device according to claim 1, further comprising an abnormality detection section for detecting the abnormal condition of the second display control section;
wherein the signal switching section outputs the first display signal from the first display control section onto the display section when the abnormality detection section detects the abnormal condition of the second display control section.

3. The display control device according to claim 2, wherein the first display control section comprises the abnormality detection section.

4. The display control device according to claim 2, wherein the second display control section comprises the abnormality detection section.

5. The display control device according to claim 1, wherein the operation program in the second display control section is rewritable.

6. The display control device according to claim 1, wherein the first and second display signals comprise image data regarding a same condition.

7. The display control device according to claim 6, wherein the first display signal outputted from the first display control section is lower in display resolution than the second display signal outputted from the second display control section.

8. The display control device according to claim 6, wherein the first display signal outputted from the first display control section is fewer in data amount than the second display signal outputted from the second display control section; and
each segment of an image expressed by the first display signal outputted from the first display control section is bigger than that of an image expressed by the second display signal outputted from the second display control section.

9. The display control device according to claim 5, wherein the operation program is read from an outer unit, and stored in the second display control section.

10. The display control device according to claim 9, wherein the outer unit is a memory card.

11. The display control device according to claim 9, wherein the outer unit is a server from which the operation program is read through a network.

12. A display control device comprising:
an input signal processing section for processing an input signal representing a vehicle condition;
a display section for displaying an image;
a first display control section for processing an output signal from the input signal processing section and outputting a first display signal to be displayed on the display section;
a second display control section operated by an operating system program, the second display control section for processing the first display signal from the first display control section and outputting a second display signal to be displayed on the display section; and
a signal switching section for outputting the second display signal from the second display control section on to the display section at the normal time, the signal switching section for outputting the first display signal from the first display control section onto the display section when an abnormal condition of the second display control section is detected, wherein the first and second display signals comprise image data regarding the vehicle condition, and the image data of the display signal from the first display control section has a lower resolution than the image data of the display signal from the second display control section.

* * * * *